United States Patent [19]
Rand

[11] Patent Number: 5,117,437
[45] Date of Patent: May 26, 1992

[54] CONTINUOUS-WAVE PAIR-PUMPED LASER SYSTEM

[75] Inventor: Stephen C. Rand, Ann Arbor, Mich.

[73] Assignee: The University of Michigan, Ann Arbor, Mich.

[21] Appl. No.: 487,885

[22] Filed: Mar. 2, 1990

[51] Int. Cl.[5] .............................. H01S 3/09
[52] U.S. Cl. ........................ 372/91; 372/41; 372/66; 372/92
[58] Field of Search ............... 372/91, 41, 66, 98, 372/92

[56] References Cited

U.S. PATENT DOCUMENTS

| | | | |
|---|---|---|---|
| 3,617,939 | 11/1971 | Bond | 331/94.5 |
| 3,824,492 | 7/1974 | Brienza et al. | 331/94.5 |
| 3,986,130 | 10/1974 | Soures et al. | 330/4.3 |
| 4,397,023 | 11/1981 | Newman et al. | 372/70 |
| 4,739,507 | 4/1988 | Byer et al. | 372/22 |
| 4,773,060 | 12/1985 | Shimada et al. | 369/100 |
| 4,782,494 | 5/1986 | Pollack et al. | 372/91 |
| 4,797,889 | 6/1987 | Lempicki | 372/39 |
| 4,807,240 | 2/1989 | Goldstone | 372/69 |
| 4,820,445 | 4/1989 | Piekarczyk et al. | 252/301.4 |
| 4,837,771 | 6/1989 | Baer | 372/75 |
| 4,845,529 | 7/1989 | Pearson et al. | 355/32 |

OTHER PUBLICATIONS

Kintz et al, Appl. Phys. Lett, vol. 50(22), Jun. 1, 1987, "CW and Pulsed 2.8 μm Laser Emission From ...", p. 1553.

Primary Examiner—Georgia Epps
Attorney, Agent, or Firm—Rohm & Monsanto

[57] ABSTRACT

Continuous laser action is sustained by a new pumping mechanism which relies exclusively on cooperative electronic transitions of coupled atoms or ions in solids. The present invention is the first of a new class of laser device which depends on energy-sharing interactions between colliding atoms in gases or active dopants in solid laser media to create the population inversion needed for amplification of light. In one specific embodiment, a laser crystal which is formed of calcium fluoride is doped heavily with trivalent erbium, and is provided with reflective coatings on respective first and second surfaces. A pumping energy is supplied whereby a pair of atoms are elevated to an initial excited state. Subsequently, one of the atoms loses energy so as to assume a ground state, the energy released thereby being made available to excite the second atom to a still higher quantum energy state. Thus, a cooperative energy interaction between the pair of atoms results in the double excitation of one of the atoms above the initial excitation state. The excited ion subsequently, upon relaxation to its initial excited energy level, causes the issuance of the laser photon. The invention is not limited to solid laser media, and may be employed in gas or liquid laser systems. Additionally, transition metal ions may be employed as an alternative to rare earth ions.

20 Claims, 5 Drawing Sheets

CONTINUOUS-WAVE PAIR-PUMPED LASER SYSTEM

RIGHT OF THE UNITED STATES GOVERNMENT

This invention was made with government support under contract (Contract Number F49620-88-C-0079) awarded by the U.S. Air Force Office of Scientific Research. The government has certain rights in the invention.

BACKGROUND OF THE INVENTION

This invention relates generally to laser systems, and more particularly, to a laser device which relies upon energy-sharing interactions between colliding atoms in gases or active dopants in solid laser media, and thus forms a new operating principle for continuous-wave solid state lasers.

The tremendous growth in laser technology and the actual and potential applications of such devices have placed greater demands on the need for lasers which operate efficiently at short wavelengths. Additionally, the demand has increased dramatically for laser systems which are compact and efficient in their energy utilization. One application which has taken significantly increased prominence in recent years is in the field of data storage technology, particularly in the compact disk medium. There is a need for a new, short wavelength solid state laser which operates in the ultraviolet range, so as to enable smaller focal spot sizes. In the compact laser disk medium, a smaller focal spot size produces a significant increase in the data storage density for a given area.

In the present state of the art, existing compact disk technology relies largely upon GaAs-GaAlAs diode lasers which operate at wavelengths on the order of 800 nm in the near infrared region. A reduction in the wavelength by a factor of two, so as to produce energy in the range of 400 nm, would result in an improvement in storage capacity by a factor of four. Such disproportionate benefit results from the fact that spot radius is proportional to wavelength, but storage density depends on the spot area, which is proportional to the square of the radius. Thus, significant improvements in storage capacity can be achieved from relatively small decreases in operating wavelength. In addition to the foregoing, it is now recognized that the commercial potential of short wavelength lasers is increased by reduction of total power consumption and miniaturization. Of the various categories of conventional lasers which exist, solid state lasers appear to lend themselves best to the achievement of these ends.

There are currently no blue or ultraviolet solid state lasers which operate continuously and which have been developed commercially for compact disk applications or other technologies, such as space communications. There is a need for a new method of laser excitation which permits the development of new short wavelength solid state lasers. There has previously been no suitable excitation mechanism for such lasers.

It is not presently possible to deliver conventional excitation at still shorter wavelengths without severely heating and damaging the solid laser medium. Thus, efforts to produce emission wavelengths short enough to approach the fundamental absorption edge of solids have yielded very low efficiencies. Pump light cannot penetrate to the interior of the laser medium Thus, there is a need for a pumping system which permits excitation at longer wavelengths than either the emission wavelength or the energy of the emitting state with respect to the ground state. In this manner, penetration of the pump light would not be a problem, and deleterious color center formation can be avoided.

It is, therefore, an object of this invention to provide a laser system wherein short-wavelength emission is achieved in response to long-wavelength excitation of laser media.

It is another object of this invention to provide a laser 1 arrangement wherein a population inversion required for light amplification is achieved in response to energy sharing interactions between colliding atoms in gases.

It is also an object of this invention to provide a laser arrangement wherein a population inversion required for light amplification is achieved in response to energy sharing interactions between colliding atoms in active dopants in solid laser media.

It is a further object of this invention to provide a short-wavelength laser system which does not require pump sources with more energy per photon than the emitting state of the laser transition.

It is additionally an object of this invention to provide a laser arrangement which achieves a reduced focal spot size.

It is yet a further object of this invention to provide a laser arrangement which improves the storage density of a compact disk.

It is a still further object of this invention to provide an excitation mechanism for a continuous-wave short-wavelength laser system.

It is also another object of this invention to provide a laser system which can operate at wavelengths on the order of 400 nm.

It is yet an additional object of this invention to provide a laser arrangement which is adaptable for miniaturization, and which is efficient in its energy utilization.

It is still another object of this invention to provide a pair-pumped solid state laser wherein the wavelength of the emitted energy is significantly shorter than that of the pump light.

It is also a further object of this invention to eliminate deleterious color center formation in a laser arrangement.

It is additionally another object of this invention to provide a continuous-wave solid state laser in which pumping is provided by cooperative upconversion due to coupled dopant atoms or ions (pair pumping) in the solid laser media.

A still further object of this invention is to provide a laser excitation system in which pump light is absorbed on a strong transition with only one ion of a pair being effectively excited at a time.

An additional object of this invention is to provide a laser system which produces laser light having a wavelength characteristic which is on the order of one-half that of the pump light.

SUMMARY OF THE INVENTION

The foregoing and other objects are achieved with this invention which provides, in an apparatus aspect thereof, an arrangement for creating population inversion for use in a continuous wave pair-pumped laser system. In accordance with a specific embodiment of the invention, a laser crystal which is formed of calcium fluoride is doped to a predetermined extent with trivalent erbium, and is configured to have first and second surfaces coated for achieving predetermined reflectivity characteristics. A pumping system is provided for supplying a pumping energy to the laser crystal and causing respective ones of the atoms in the laser crystal to gain energy so as to assume respectively higher energy, or quantum, states. Subsequently, pairs of near neighbor ions in these higher energy states spontaneously redistribute or share their total energy such that certain ones assume lower enery states whereas their associated others rise to still higher energy states. In this manner, laser action is achieved by cooperative upconversion induced by ion-ion interactions.

In a specific embodiment of the invention, the laser crystal is doped with trivalent erbium to an extent of approximately 5%. Thus, the laser crystal is heavily doped, in this embodiment, with a rare earth multivalent dopant.

In one embodiment of the invention, the pumping means is of a type which produces a continuous pumping energy. In this manner, the atoms in the laser crystal are urged continuously to the respective higher and lower energy states. In the specific illustrative embodiment, the atoms in the laser crystal are erbium ions.

In a practical embodiment of the invention, the laser crystal is cut to a thickness of about 3 mm, and both faces are polished to a laser-grade finish. One face is flat; within a tenth of a wavelength. The second face is convex, and has a convex radius of curvature of about 2.5 cm. The convex face, or end, of the laser crystal is coated to achieve a reflectivity of less than 0.25% at 1.5 microns, and 100% at 2.8 microns. The flat surface is coated for 98% reflectivity at 2.8 microns, and also serves as the partially reflecting output coupler. In this way, a resonant cavity, which is essential for laser action, is formed.

In the specific embodiment, the laser crystal is pumped by a 200 mW continuous wave NaCl color center laser operating at 1.5 microns. The beam is focused into the crystal at room temperature with a single lens of focal length of about 5 cm. This excitation is sufficient to produce continuous laser action at an output wavelength of 2.8 microns with only very small amplitude fluctuations ($< -15$ dB). Because the cooperative upconversion mechanism is nonlinear, and nonlinear systems typically exhibit sustained oscillations or even chaotic behavior, this result is not an obvious extension of previous pulsed pair-pumped laser work.

In still further embodiments of the invention, the crystal host may be changed to alter the proportion of dopant ions which cluster as pairs. For example, crystals which are isomorphic with $CsNiCl_3$, such as $CsCdBr_3$, are known to incorporate trivalent rare earth ions predominantly as near neighbor pairs, all oriented identically along the optic axis. This kind of crystal incorporates dopant ions far more efficiently as pairs than ordinary crystals, and it will tend to avoid unnecessary absorption losses due to unwanted aggregates of three or more ions, or of single ions. It is to be understood that other rare earth ions, or transition ions, may be used in the practice of the invention. Additionally, a variety of cavity configurations are available in the practice of the invention, the configuration of which is within the knowledge of persons of skill in the art. For example, the mirrors need not be deposited directly on the crystal, and may be stably configured external thereto.

In addition to the foregoing, the laser system of the present invention is not limited to the employment of solid laser media. Appropriate vapors or gas mixtures may be substituted for the solid pair-pumped laser medium. Collisions between excited atoms in gases will cause transient coupling equivalent to the coupling between dopants in solids. Collision-induced transitions can result in a variety of normally forbidden processes, including spontaneous, cooperative upconversion processes, and pair-pumped laser action, just as in condensed media.

In accordance with a method aspect of the invention, a method of creating continuous-wave laser emission is provided with the steps of:

providing a multiple quantum level environment for atoms wherein the atoms can achieve selectably higher and lower quantum levels than their initial excited state;

providing a pumping source for generating a pumping energy; and directing the pumping energy toward the multiple quantum level environment so as to cause respective ones of the atoms within the multiple quantum level environment to gain energy and assume a respectively higher energy state referred to as the "initial excited state," above the resting state, and respective others of the atoms also in an initial excited state, to lose energy and assume a lower energy state to assist promotion of their partners to still higher energy states, whereby the continuous-wave laser action is achieved by cooperative energy upconversion induced by atom-atom interactions.

In a specific embodiment of this method aspect of the invention, there is additionally included the step of providing a multiple quantum level environment which comprises the further step of doping the multiple quantum level environment with a dopant which is characterized by containing multivalent rare earth ions. In a highly advantageous embodiment, the dopant is erbium, and the multiple quantum level environment is formed of calcium fluoride. In the alternative, the multiple quantum level environment may be formed of $CsCdBr_3$, which is isomorphic with $CsNiCl_3$, and the dopant might be some other rare earth such as praseodymium or neodymium. The dopant is not limited to being a rare earth ion, but may be a transition metal ion. Of course, more conventional laser host crystals, such as $LiYF_4$ may be employed in the practice of the invention.

In accordance with a further method aspect of the invention, there is provided a method of creating continuous-wave laser emission having a predetermined wavelength characteristic, the method being characterized by:

providing a multiple quantum level environment for atoms associated with a multivalent dopant, the multiple quantum level environment being characterized by having at least three energy levels wherein the atoms can achieve selectably higher and lower quantum levels than their initial excited state;

providing a pumping source for generating a pumping energy having a wavelength characteristic which is longer than that of the laser emission; and directing the pumping energy toward the multiple quantum level environment so as to cause respective ones of the atoms within the multiple quantum level environment to gain energy and assume respectively higher energy states and respective others of the atoms to lose energy and assume lower energy states, whereby the continuous-wave laser action is achieved by cooperative energy upconversion induced by atom-atom interactions.

In the presently highly specific embodiment relying on erbium ions, the respectively higher energy state $^4I_{9/2}$ is two quantum levels above the initial excited state $^4I_{13/2}$, and the laser action has a wavelength determined by transitions between two lower energy states, namely $^4I_{11/2}$ and $^4I_{13/2}$, the upper of which ($^4I_{11/2}$) is reached by nonradiative relaxation of atoms from state $^4I_{9/2}$.

BRIEF DESCRIPTION OF THE DRAWING

Comprehension of the invention is facilitated by reading the following detailed description, in conjunction with the annexed drawing, in which.

DETAILED DESCRIPTION

Figure 1:
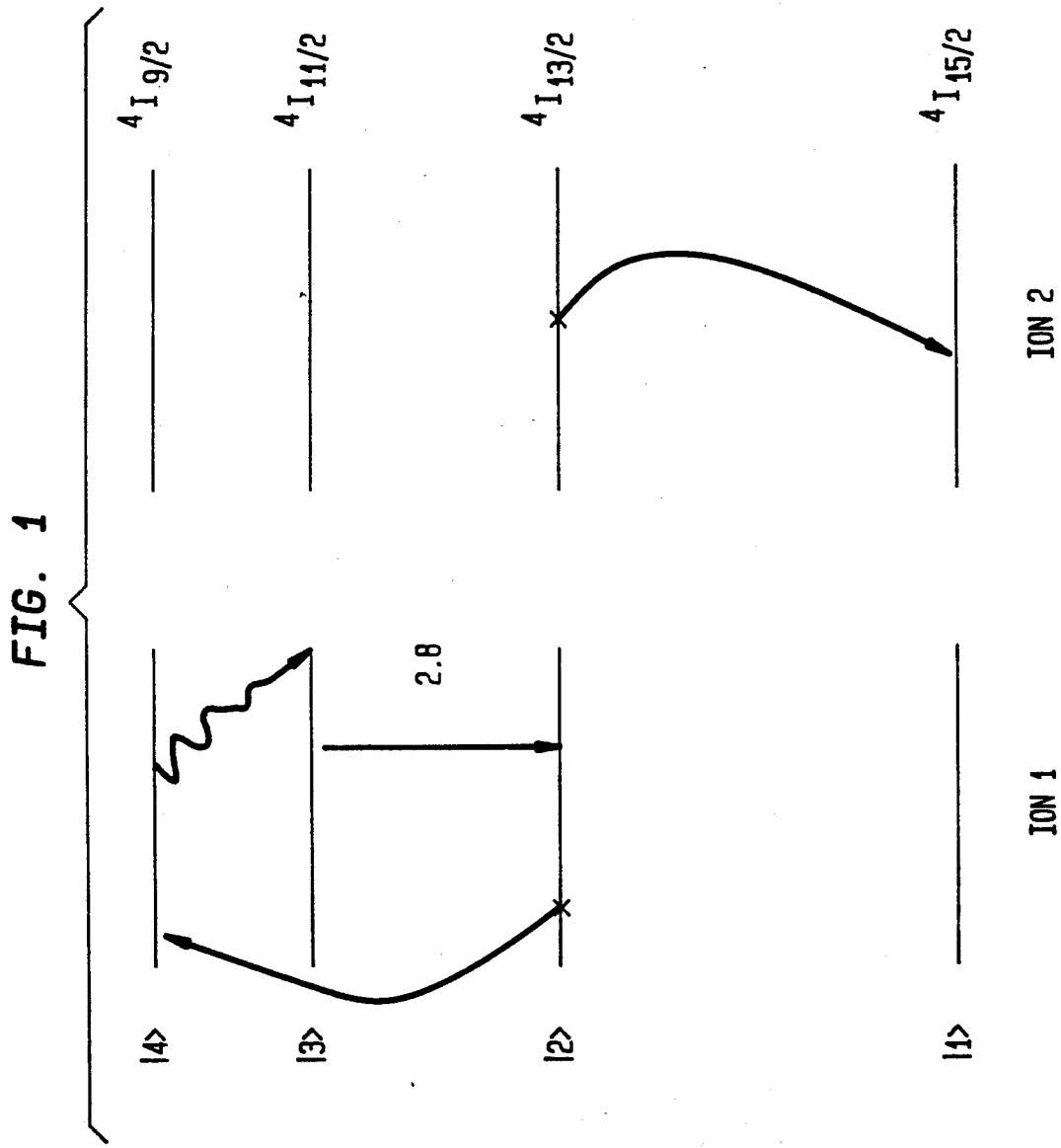
FIG. 1 is a schematic representation of the energy levels involved in the continuous wave pair-pumped erbium layer, in accordance with the principles of the present invention, illustrating the cooperative pair process involving two resonantly excited ions, which results in population inversion in the upconverted energy state $^4I_{11/2}$.

FIG. 1 is a schematic representation of the energy levels which are involved in the continuous-wave, pair-pumped erbium laser system constructed in accordance with the principles of the present invention. As shown in this figure, the curved arrows indicate the cooperative pair-process involving two resonantly excited ions which result in population inversion in the upconverted energy state $^4I_{11/2}$. FIG. 1 is divided into two representations, one associated with Ion 1 and the other associated with Ion 2. Both such ions are initially located in excited state $^4I_{13/2}$, by virtue of absorption of pump light. By virtue of electromagnetic coupling betten Ion 1 and Ion 2, Ion 1 is spontaneously energized to energy level $^4I_{9/2}$. Ion 2, on the other hand, loses energy and assumes energy level $^4I_{15/2}$. Thus, one ion becomes "doubly excited" while the other becomes de-excited.

Doubly excited Ion 1 subsequently is subjected to an energy decay from quantum level $^4I_{9/2}$ to $^4I_{11/2}$. A photon corresponding to an energy of 2.8 microns is issued upon the relaxation of Ion 1 to level $^4I_{13/2}$.

As a result of the high dopant concentration and the nature of the crystal host used, aggregates of rare earth ions exist within the solid. These aggregates consist of dopant ions in clusters. Electromagnetic coupling between dopant neighbors in pair clusters permits two ions which individually reach an excited state by absorbing single photons from the incident light to "pool" or combine their energy through what is known as a "cooperative" transition. This mechanism, which is represented in FIG. 1, results in the double excitation and the de-excitation of the respective members of the ion pair.

Figure 2:
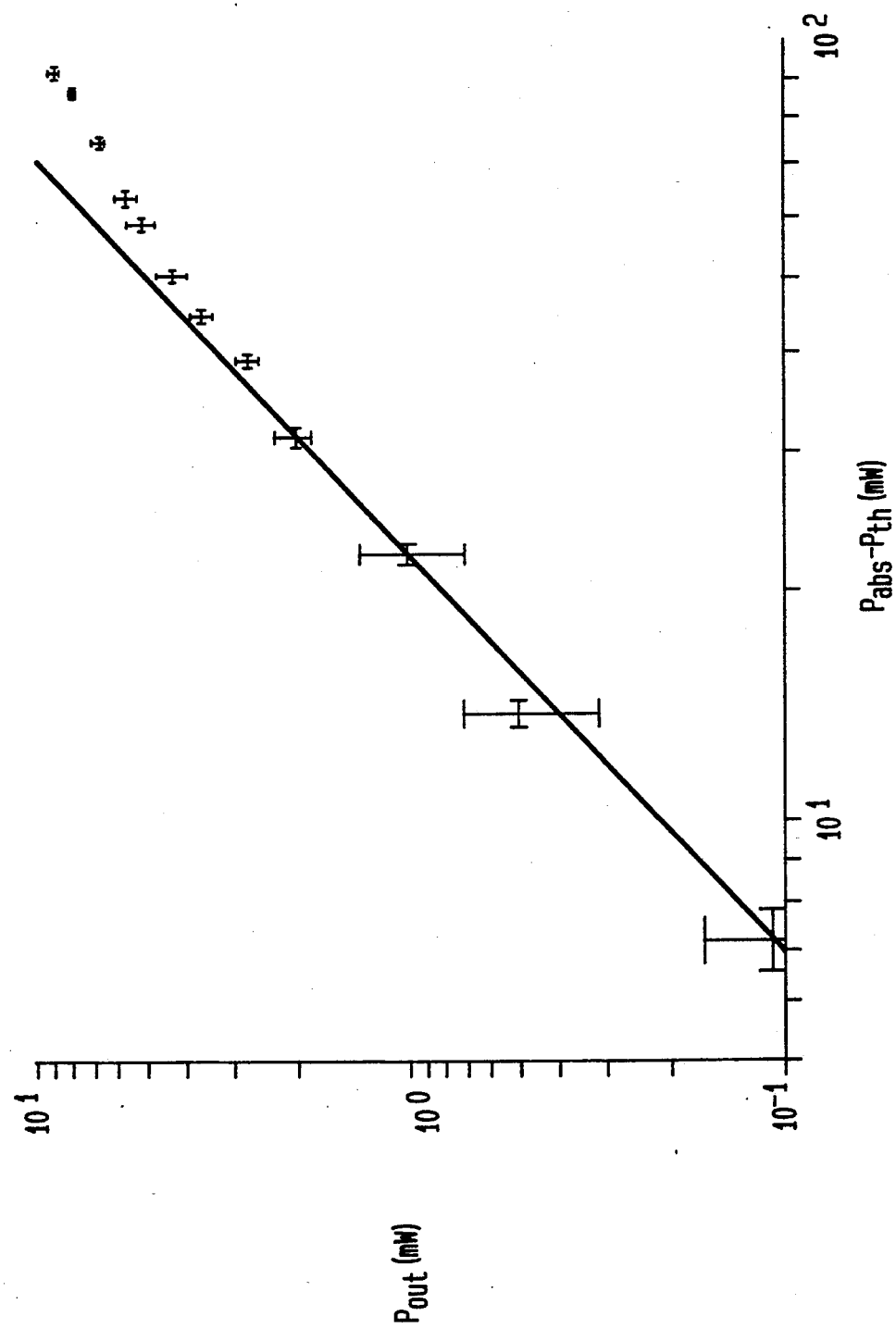
FIG. 2 is a graphical representation in log-log format which is useful in illustrating the differences between the continuous wave output power of the $Er^{3+}:CaF_2$ upconversion laser of the present invention versus absorbed continuous wave input power above threshold.

FIG. 2 is a graphical representation in log-log format which illustrates the differences between the continuous wave output power of the $Er^{3+}:CaF_2$ upconversion laser of the present invention versus absorbed continuous wave input power above threshold. As shown in this figure, the solid curve illustrates the quadratic dependence followed at low powers and shows the onset of saturation at higher powers.

Figure 3:
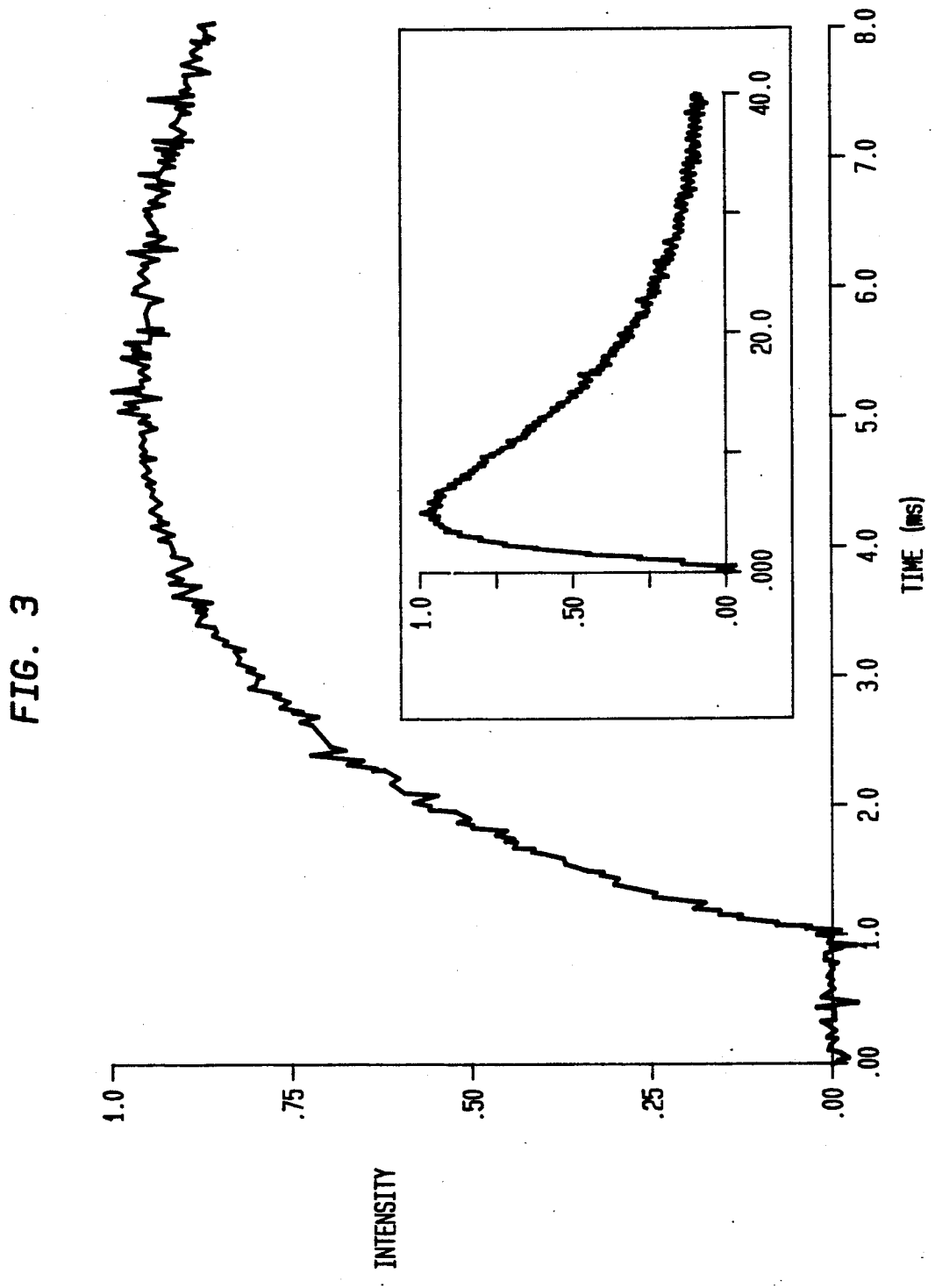
FIG. 3 is a graphical representation of $^4I_{11/2}$ to $^4I_{15/2}$ fluorescence versus time at 985 nm excited by a 30 microsecond, rectangular laser pulse having a wavelength of 1.51 microns, and is useful in illustrating pumping by a pair process wherein one ion loses energy and the other gains energy, as well as the absence of other pumping mechanisms such as two-photon absorption which would cause an immediate jump in the fluorescence intensity within the 30 microsecond pump pulse duration.

FIG. 3 is a graphical representation of fluorescence resulting from transitions from $^4I_{11/2}$ to $^4I_{15/2}$, plotted versus time, at 985 nm excited by a 30 microsecond, rectangular laser pulse having a wavelength of 1.51 microns. This representation illustrates that pumping by a pair process, wherein one ion loses energy and the other gains energy, is occurring in the operation of the device without contributions due to two-photon absorption greater than 1 percent. The absence of fluorescence response during the excitation pulse indicates that the upper laser level is only populated after termination of pumping by the pair process. As previously indicated, one ion loses energy by returning to the ground state. The other ion gains energy by upconversion to the energy level $^4I_{9/2}$ which then relaxes rapidly to populate the upper laser level $^4I_{11/2}$.

Figure 4:
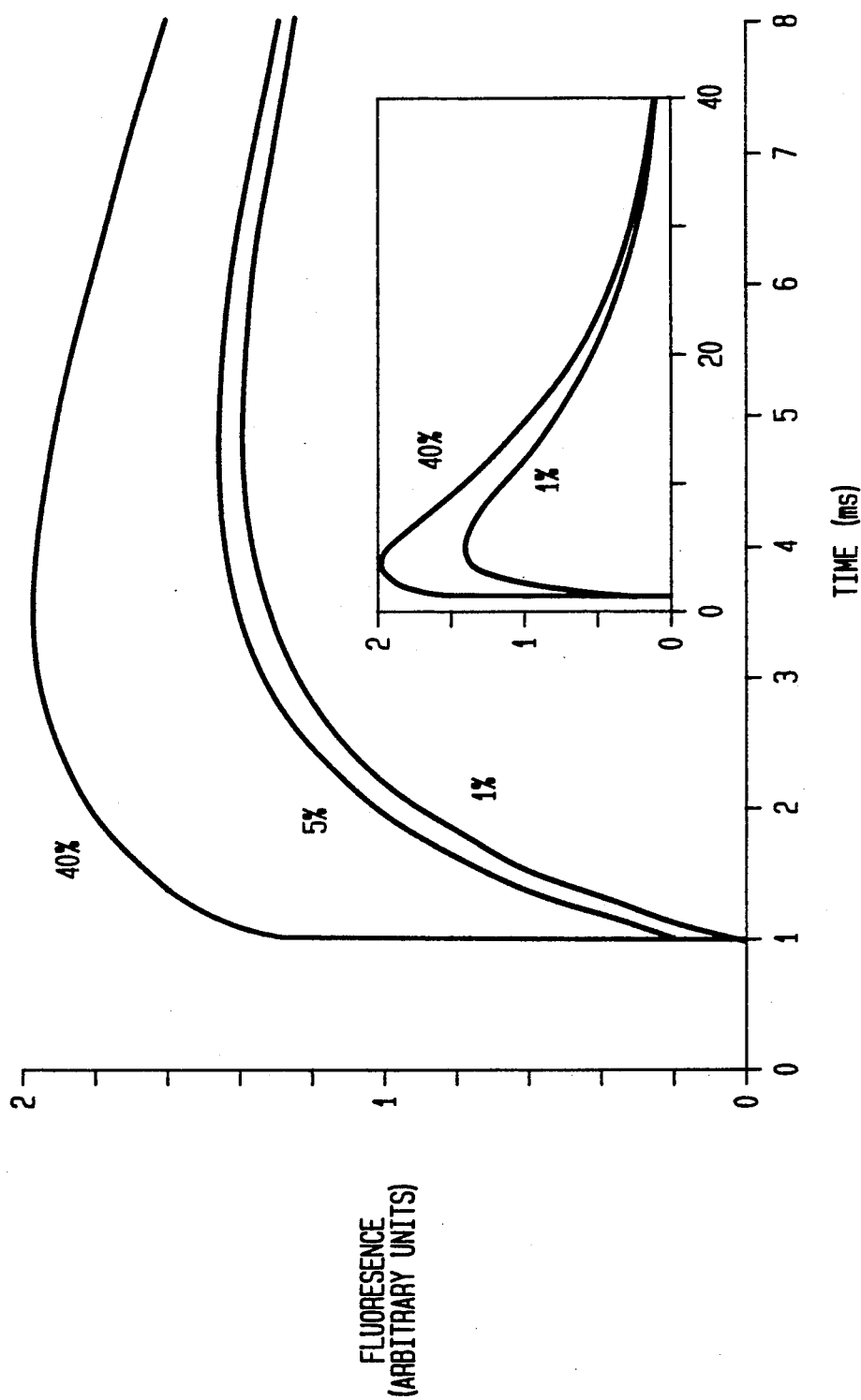
FIG. 4 is a graphical representation of the calculation of the expected evolution of fluorescence when various proportions of the of the excited state population are furnished by 2-photon absorption during the 30 microsecond pulse interval of FIG. 3.

FIG. 4 is a graphical representation of the calculation of the expected evolution of fluorescence when various proportions of the of the excited state population are furnished by 2-photon absorption during the 30 microsecond pulse interval, described hereinabove with respect to FIG. 3. The experimentally derived ratio of 2-photon to 2-atom contributions is evidently much smaller than $10^{-2}$ at short times. In the steady state, it contributes even less, because the pair rate grows as the square of the excited state density.

The continuous-wave operating characteristic of the laser of the present invention was verified by monitoring the narrow beam emission transmitted by a 2.8 micron interference filter having a spectral band width of 10 nm, and using a fast photodiode having an electronic band width of 1 Mhz. Even without active cooling of the crystal, stable operation of this device has been observed for many hours with no spiking or sustained oscillations greater than $-15$ dB.

Figure 5:
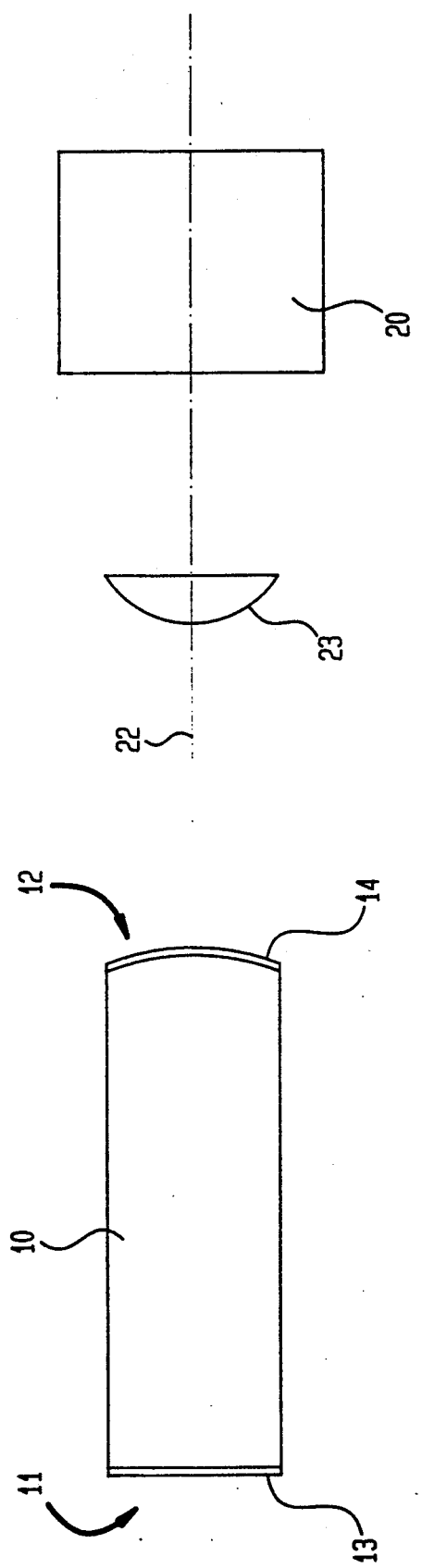
FIG. 5 is a schematic representation of an arrangement constructed in accordance with the principles of the invention.

FIG. 5 is a schematic representation of an arrangement constructed in accordance with the principles of the invention. As shown, a laser crystal 10 is cut to a thickness of approximately 3 mm (on the order of one absorption length), and faces 11 and 12 are polished. Face 11 is flat, while face 12 is convex, and may have a radius of curvature of approximately 2.5 cm.

End face 11 is provided with a reflective coating 13 which, in this specific illustrative embodiment, is characterized by a 98% reflectivity at 2.8 µm. This end of laser crystal 10 additionally serves as a partially reflecting output coupler. Face 12 is provided with a reflective coating 14 having a specific reflectivity characteristic. At 1.5 microns, the reflectivity of coating 14 is less than 0.25%. However, the reflectivity is approximately 100% at 2.8 μm.

In the schematic representation of FIG. 5, laser crystal 10 is pumped by a light source 20 which, in the specific illustrative embodiment, produces a 200 mW continuous wave NaCl color center operating at approximately 1.5 μm. The output energy of the energy source is represented herein as an axis 22, and is shown to be propagated through a lens 23. In this embodiment, lens 23 has a focal length of approximately 5 cm.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for use in a laser device, the arrangement comprising:
   a laser crystal for emitting coherent radiation said laser crystal having a trivalent rare earth incorporated therein and having first and second surfaces, each coated to produce a predetermined reflectivity characteristic; and
   pumping means for supplying a continuous-wave, coherent pumping energy to said laser crystal and causing electrons in respective ones of atoms within said laser crystal to gain energy so as to achieve respectively higher energy states and electrons in respective others of said atoms to lose energy so as to achieve lower energy states, whereby continuous-wave laser action is achieved by cooperative energy upconversion induced by interactions between said atoms, said continuous-wave laser action having a higher energy level than said continuous-wave, coherent pumping energy.

2. The arrangement of claim 1 wherein said laser crystal is formed of $CaF_2$ doped with trivalent erbium.

3. The arrangement of claim 1 wherein said pumping means operates to urge said atoms continuously to said respective higher and lower energy states.

4. The arrangement of claim 1 wherein said atoms within said laser crystal are erbium ions.

5. The arrangement of claim 1 wherein said laser crystal is configured to have first and second ends, said first end having a convex surface configuration, and said second end having a plane surface configuration.

6. The arrangement of claim 5 wherein said convex surface configuration of said first end of said laser crystal has a convex radius of curvature of approximately 2.5 centimeters.

7. The arrangement of claim 6 wherein said first and second ends are each provided with a respective one of first and second coatings applied thereto, said coatings each having a respective predetermined reflectivity.

8. The arrangement of claim 7 wherein said first coating has a reflectivity characteristic which varies with wavelength, said first coating having a reflectivity of approximately 0.25% at a wavelength of 1.5 microns, and a reflectivity of approximately 100% at a wavelength of 2.8 microns.

9. The arrangement of claim 7 wherein said second coating has a reflectivity of approximately 98% at a wavelength of 2.8 microns, and further operates as an output coupler.

10. The arrangement of claim 1 wherein said pumping means further comprises a pumping laser having a NaCl color center operating at approximately 1.5 microns.

11. The arrangement of claim 1 wherein said laser crystal is formed of $CsCdBr_3$ which is isomorphic with $CsNiCl_3$.

12. A method of creating continuous-wave laser emission, the method comprising the steps of:
    providing a multiple quantum level environment for electrons associated with atoms wherein said electrons can achieve selectably higher and lower quantum levels than their initial excited state;
    providing a pumping source for generating a continuous-wave coherent pumping energy; and
    directing said pumping energy toward said multiple quantum level environment so as to cause electrons associated with respective ones of said atoms within said multiple quantum level environment to gain energy and assume a respectively higher energy state than said initial excited state and electrons associated with respective others of said atoms to lose energy and assume a lower energy state than said initial excited state, whereby the continuous-wave laser action is achieved by cooperative energy upconversion induced by atom-atom interactions, said continuous-wave laser action occurring at a higher energy level than that of said continuous-wave coherent pumping energy.

13. The method of claim 12 wherein said multiple quantum level environment incorporates a dopant which is characterized by containing multivalent rare earth ions.

14. The method of claim 13 wherein said dopant is erbium.

15. The method of claim 13 wherein said multiple quantum level environment is formed of calcium fluoride.

16. The method of claim 13 wherein said multiple quantum level environment is formed of $CsCdBr_3$ which is isomorphic with $CsNiCl_3$.

17. The method of claim 13 wherein said dopant is a rare earth ion.

18. The method of claim 13 wherein said dopant is a transition metal ion.

19. A method of creating continuous-wave laser emission having a predetermined wavelength characteristic, the method comprising the steps of:
    providing a multiple quantum level environment for electrons of atoms associated with a multivalent dopant, the multiple quantum level environment being characterized by having at least three energy levels wherein said electrons can achieve selectably higher and lower quantum levels than their initial excited states;
    providing a pumping source for generating a continuous-wave coherent pumping energy having a wavelength characteristic which is longer than that of the laser emission; and
    directing said pumping energy toward said multiple quantum level environment so as to cause electrons associated with respective ones of said atoms within said multiple quantum level environment to gain energy and assume a respectively higher energy state and electrons associated with respective others of said atoms to lose energy and assume a lower energy state, whereby the continuous-wave laser action is achieved at a higher energy level than said continuous-wave coherent pumping energy by cooperative energy upconversion induced by atom-atom interactions.

20. The method of claim 19 wherein the respectively higher energy state is two quantum energy levels above the initial excited state, and the laser action has a wavelength characteristic responsive to one of said quantum energy levels.

* * * * *